UNITED STATES PATENT OFFICE.

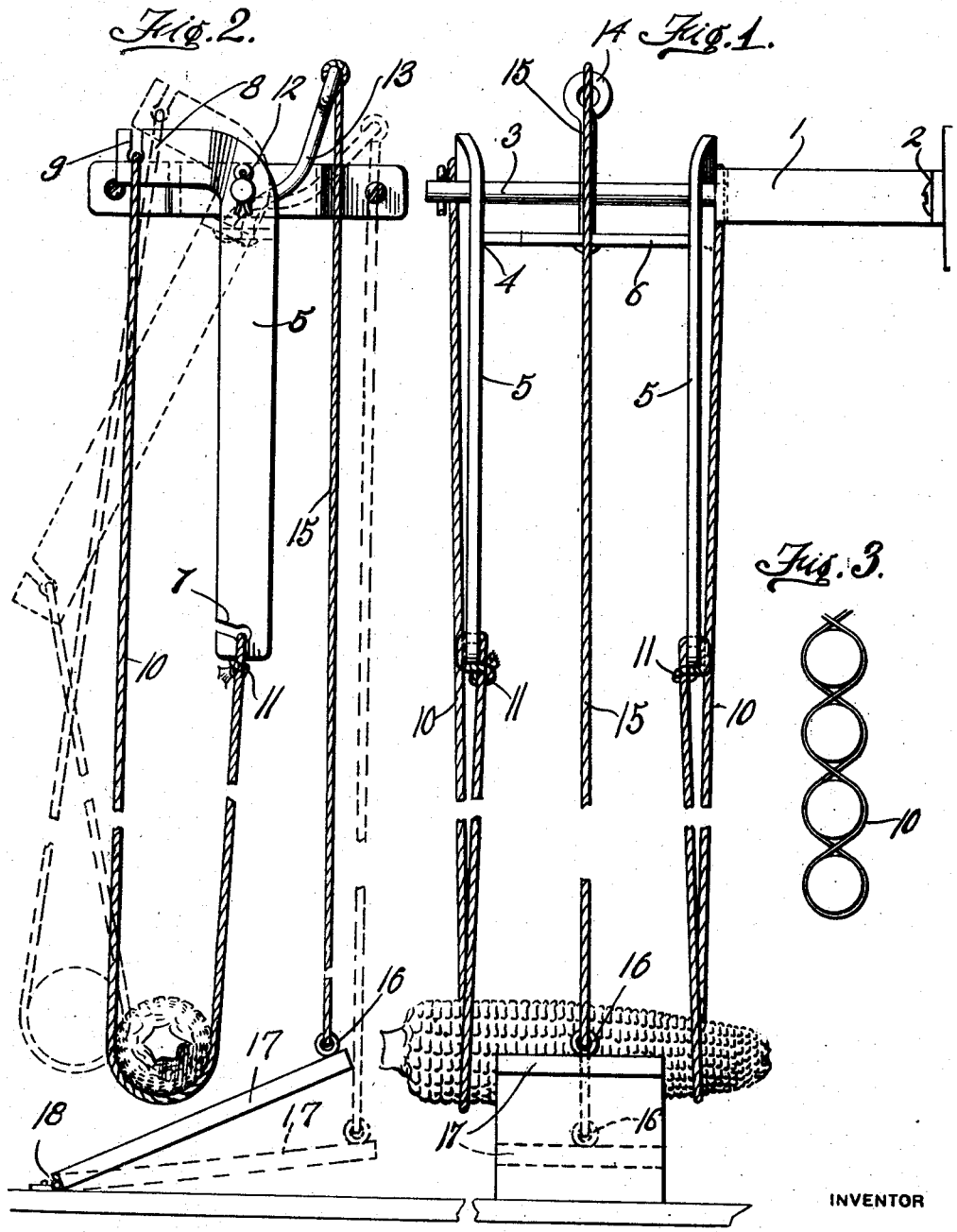

JESSE M. MARRINGTON, OF NEMAHA, IOWA.

SEED-CORN STRINGER.

1,227,059.

Specification of Letters Patent.

Patented May 22, 1917.

Application filed February 7, 1916. Serial No. 76,840.

*To all whom it may concern:*

Be it known that I, JESSE M. MARRINGTON, a citizen of the United States, residing at Nemaha, in the county of Sac and State of Iowa, have invented certain new and useful Improvements in Seed-Corn Stringers, of which the following is a specification.

This invention has relation to certain new and useful improvements in seed corn stringers and has for its primary object, the provision of a device of this character which will be of simple and cheap construction as well as highly efficient in use.

Another object of the invention resides in the provision of a device of this character which may be readily operated while placing ears of corn in the suspending cords and which will be of such construction that the suspending cords may be readily crossed at the insertion of the first or lower ear so as to securely clamp the remaining ears in proper position.

A further object of the invention resides in the provision of a seed corn stringer which will be of such construction that the suspending cord may be readily reversed and overlapped or crossed by operation of a treadle or lever after the insertion of each ear of corn.

The invention has for a still further object, the provision of a seed corn stringer of the above stated character which will be of such construction as to include a double right angled bracket to the opposite arms of which are secured the opposite extremities of the parallel suspending cords, whereby swinging movement of the double bracket caused by operation of the treadle or lever will result in crossing of the suspending cords over the uppermost ear of corn to provide a pocket to receive each end of the next ear to be placed in position.

With the above and other objects in view, this invention resides in the combination and arrangement of coöperating parts as will be hereinafter more specifically set forth, pointed out in the appended claims and shown in the accompanying drawings, in which:

Figure 1 is a rear elevation of the complete device with the first or lowermost ear of corn shown in position, Fig. 2 is a side elevation at right angles to Fig. 1 and showing the double right angled bracket as being swung slightly upon its shaft, by dotted lines, during the first operation of crossing the suspending cords, and Fig. 3 is a detail view, showing the manner in which the suspending cords are crossed and recrossed to clamp the ears of corn in proper position above one another.

Referring more particularly to the drawings in which similar reference characters designate corresponding parts throughout the several views 1 designates a bracket of conventional form which may be secured as shown at 2, to a stationary support such as a wall and which forms a bearing for a stationary shaft 3, which latter has one end secured in the central or outer portion of said bracket 1, as will be more readily understood by referring to the drawings.

The shaft 3 serves as a support for the double right angled bracket 4 which is composed of a pair of right angled members which are positioned parallel to one another and connected adjacent their turned portions by a cross arm 6, the shaft 3 extending through the turned portions of the right angled members. Each right angled member includes a depending long arm 5 having a transverse slot 7 extending inwardly from one side edge, adjacent the lower end of said arm 5. The remaining short arm 8 of each right angled member is offset outwardly from the long arm 5 and is normally in a horizontal position, as shown in Fig. 2. This short arm 8 of each right angled member is also provided in its upper edge, adjacent its free extremity with a slot 9 extending downwardly. The purpose of the slots 7 and 9 is to provide means whereby the suspending cords 10 may be secured to the free ends of the arms 5 and 8 of each right angled member. Each suspending cord 10 is secured, as shown at 11, by one end to the lower end of one depending arm 5 then extended downwardly for a suitable distance, bent upon itself and extended upwardly so as to form an elongated loop. The cord 10 is then engaged in the slot 9 and connected with the corresponding end of the opposite suspending cord which rests in the slot 9 of the corresponding arm 8.

Any suitable securing member 12 may be secured in the outer end of the shaft 3 to prevent the double right angled bracket from working off the shaft 3.

An operating lever 13 is secured by one end to the cross arm 6 and bent to avoid the shaft 3, the lever 13 being preferably extended rearwardly and upwardly and provided with an eye 14 at its upper end, to which is secured one end of an operating cable 15. The operating cable 15 is shown as having its opposite end secured in a suitable fastening member 16 carried by the hinged treadle 17 which has one end hinged, as shown at 18 to a stationary member such as a floor.

In use, the first ear of corn is placed in the bottom of the elongated loop, as shown in Figs. 1 and 2. The double swinging bracket is then swung upon the shaft 3, as indicated in Fig. 2, by pressure upon the treadle 17 or by a pull upon the operating cable 15, until the suspending cords 10 cross over the ear of corn sufficiently to form another pocket. The second ear of corn is then placed in the second pocket, preferably with the ear reversed. As soon as the second ear is placed in position, the pressure upon the operating lever 13 is relieved, permitting the long depending arms 5 of the right angled members to return the right angled swinging bracket toward its original position, owing to the weight of the depending arms 5 together with weight of the ears of corn and the suspending cords. This return movement of the double swinging bracket causes a crossing of the cords 10 in a reverse direction over the second ear of corn and provides above the same a third pocket for the third ear of corn. The operation is repeated until the suspending cords are filled or the desired number of ears of corn have been placed in the same. It will be evident that the cords 10 will securely clamp the opposite ends of the ears of corn and hold the same in suspended position until removed from stringer.

While the preferred embodiment of the invention has been shown and described, it will be understood that many minor changes in the details of construction and arrangement of parts may be resorted to within the scope of the appended claims without departing from the spirit of the invention of sacrificing any of the advantages of the same.

What is claimed is:

1. In a corn stringer, a support, spaced L-shaped arms pivotally mounted upon the support, a horizontal bar connecting the arms, flexible elements having their ends detachably engaged in the L-shaped arms, and adapted for crossing relation upon the pivotal movement of the arms, and means connected with the horizontal bar whereby to swing the arms to arrange the flexible element in crossing relation.

2. In a corn stringer, a supported horizontally disposed pin, spaced L-shaped connected arms pivotally mounted upon the pin, flexible elements engaged in the extremities of the L-shaped arms and adapted for crossing relation upon the pivotal movement of the arms, and means for swinging said L-shaped arms.

3. In a seed corn stringer, a supported pivot pin, spaced L-shaped connecting arms pivotally mounted upon the pin and each of the arms having a notch in its extremities, flexible elements having their ends detachably engaged in the notches and adapted for crossing relation upon the swinging movement of the L-shaped arms, and a second flexible element having operative connection with the arms whereby to swing the same to arrange the first mentioned flexible element in crossing relation.

In testimony whereof I affix my signature in presence of two witnesses.

JESSE M. MARRINGTON.

Witnesses:
A. B. PATTERSON,
LELAND COLBURN.

Copies of this patent may be obtained for five cents each, by addressing the "Commissioner of Patents, Washington, D. C."